(12) United States Patent
Menser, Jr. et al.

(10) Patent No.: US 7,720,560 B2
(45) Date of Patent: May 18, 2010

(54) SEMICONDUCTOR MANUFACTURING PROCESS MONITORING

(75) Inventors: Clayton David Menser, Jr., Marlboro, NY (US); Jeffrey Paul Gilfford, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 11/828,730

(22) Filed: Jul. 26, 2007

(65) Prior Publication Data

US 2009/0030543 A1 Jan. 29, 2009

(51) Int. Cl.
*G06F 19/00* (2006.01)
*G05B 9/02* (2006.01)
*G06F 11/30* (2006.01)
*G21C 17/00* (2006.01)
*G05B 23/02* (2006.01)

(52) U.S. Cl. .................. 700/121; 700/80; 700/108; 700/109; 700/160; 700/174; 702/182; 702/183; 702/184; 702/186; 340/3.43; 340/3.44; 340/500; 340/693.12

(58) Field of Classification Search .................. 700/80, 700/108–110, 160, 174; 702/182–186; 340/3.43–3.44, 340/500, 693.12
See application file for complete search history.

(56) References Cited

U.S. PATENT DOCUMENTS

| 6,629,012 | B1 * | 9/2003 | Riley et al. ................. 700/121 |
| 6,666,754 | B1 * | 12/2003 | Beckage ...................... 451/56 |
| 6,907,306 | B2 | 6/2005 | Hsieh et al. |
| 7,076,320 | B1 * | 7/2006 | Phan et al. ................. 700/121 |
| 7,127,358 | B2 * | 10/2006 | Yue et al. ...................... 702/30 |
| 2002/0022969 | A1 * | 2/2002 | Berg et al. ..................... 705/1 |
| 2005/0206877 | A1 * | 9/2005 | Ina et al. ...................... 356/72 |
| 2006/0259259 | A1 * | 11/2006 | Rozenboim et al. .......... 702/83 |
| 2007/0010905 | A1 * | 1/2007 | Chou ........................ 700/108 |

* cited by examiner

*Primary Examiner*—Ramesh B Patel
(74) *Attorney, Agent, or Firm*—Ian D. MacKinnon

(57) ABSTRACT

A system and method for monitoring a semiconductor manufacturing process is disclosed. The system communicates with one or more process tools, and monitors each tool during a predetermined process window time. Errors and warnings are provided to users, allowing corrective action to be taken. Additionally, the system of the present invention can initiate automatic adjustment of the process tools to maintain an efficient manufacturing operation.

13 Claims, 3 Drawing Sheets

SEMICONDUCTOR MANUFACTURING PROCESS MONITORING

FIELD OF THE INVENTION

This invention is generally related to semiconductor fabrication. More specifically, this invention relates to process control in a semiconductor manufacturing environment.

BACKGROUND

Integrated circuits are typically formed by processing several semiconductor wafers as a group or "lot" through a series of wafer fabrication process tools (hereafter, "process tools"). Each process tool typically performs a single wafer fabrication operation upon the semiconductor wafers. The integrated circuits formed in this manner are substantially identical to one another. Following wafer fabrication, the integrated circuits are typically subjected to functional testing, and then separated to form individual integrated circuits called "chips" or "die." Fully functional die are typically packaged and sold as individual units.

During operation of a process tool, one or more operating conditions are established within the process tool, typically dependent upon input (e.g., control signals) from a centralized Manufacturing Execution System (MES). An Automated Material Handling System (AMHS) is programmed to move the wafers to the needed process tools in the specified sequence to produce the finished chips.

The MES may use standard factory automation methods for semiconductor manufacturing, such as the Advanced Process Control (APC) Framework family of specifications and process tool equipment communication standard II (SECS II), which are publicly available from SEMI (The Semiconductor Equipment and Materials Institute, commonly known as SEMI, is an organization headquartered in San Jose, Calif., that publishes various specifications for the semiconductor industry). These methods are well known in the industry, and are disclosed in U.S. Pat. No. 6,907,306 (entitled "Process tool throughput monitoring system and method") which is herein incorporated by reference in its entirety.

With many process tools, each having possibly hundreds of individual parameters, the task of monitoring a semiconductor manufacturing line can be challenging. To be cost effective, delays due to faulty (or out-of-tolerance) equipment must be minimized. Quick detection of such problems is paramount to minimizing this delay. Therefore, what is needed is an improved system and method for monitoring a semiconductor manufacturing process.

SUMMARY OF THE INVENTION

The present invention provides a semiconductor manufacturing process monitoring system, comprising:
 a network communications module, the network communications module in communication with at least one process tool and configured to retrieve process data from the at least one process tool;
 a data management module that is configured to store the process data;
 a data analysis module that is configured to analyze the process data, and assert an action sequence indication;
 a user interface module that is configured to accept at least one process window time;
 an activation module that is configured to initiate a monitoring sequence upon detecting an initiation event;
 an action sequence module that is configured to execute an action sequence upon receiving an action sequence indication from the data analysis module; and
 an alert generation module that is configured to issue at least one operator alert upon receiving an action sequence indication from the data analysis module.

The present invention further provides a system in which the alert generation module is configured to issue at least one operator alert comprising an e-mail message.

The present invention further provides a system in which the alert generation module is configured to issue at least one operator alert comprising a text message.

The present invention further provides a system in which the alert generation module is configured to issue at least one operator alert comprising an instant message.

The present invention further provides a system in which the at least one process tool is selected from the group consisting of a chemical vapor deposition tool, physical vapor deposition tool, stepper tool, sputter tool, tube furnace, reactive ion etch tool, aligner, ion implantation system, electrochemical plating tool, and a chemical mechanical polish tool.

The present invention also provides a method for monitoring a semiconductor manufacturing process, comprising the steps of:
 defining at least one process window time;
 retrieving process data from a process tool;
 storing the process data;
 analyzing the process data;
 generating an action sequence indication based on the outcome of the analyzing step;
 accepting at least one process window time from a user;
 detecting an initiation event;
 initiating a monitoring sequence;
 executing an action sequence; and
 issuing at least one operator alert.

The present invention further provides a method wherein the step of detecting an initiation event comprises the step of detecting the arrival of a lot of wafers at the process tool.

The present invention further provides a method wherein the step of detecting an initiation event comprises the step of detecting the expiry of the process window time.

The present invention further provides a method wherein the step of detecting an initiation event comprises the step of detecting a manual initiation from an operator.

The present invention further provides a method wherein the step of executing an action sequence comprises the step of disabling a process.

The present invention further provides a method wherein the step of executing an action sequence comprises the step of disabling a process tool.

The present invention further provides a method wherein the step of executing an action sequence comprises the step of adjusting a process tool.

The present invention further provides a method wherein the step of establishing a process window time for a particular process tool.

The present invention further provides a method wherein the step of associating the process window time with a particular job.

The present invention further provides a method wherein the step of issuing at least one operator alert further comprises the step of sending an e-mail to a predetermined list of recipients.

The present invention further provides a method wherein the step of issuing at least one operator alert further comprises the step of sending a text message to a predetermined list of recipients.

The present invention further provides a method wherein the step of issuing at least one operator alert further comprises the step of sending an instant message to a predetermined list of recipients.

The present invention further provides a method wherein the step of analyzing said process data comprises comparing at least one warning retrieved from a process tool to predetermined warning criteria, and issuing a control action sequence if the retrieved warning matches the predetermined warning criteria.

The present invention further provides a method wherein the step of step of adjusting a process tool comprises adjusting the temperature of a tube furnace.

The present invention further provides a method wherein the step of step of adjusting a process tool comprises adjusting the slurry flow rate of a chemical mechanical polish tool.

DETAILED DESCRIPTION

Reference will now be made in detail to the presently preferred embodiments of the invention, examples of which are illustrated in the accompanying drawings.

Figure 1:
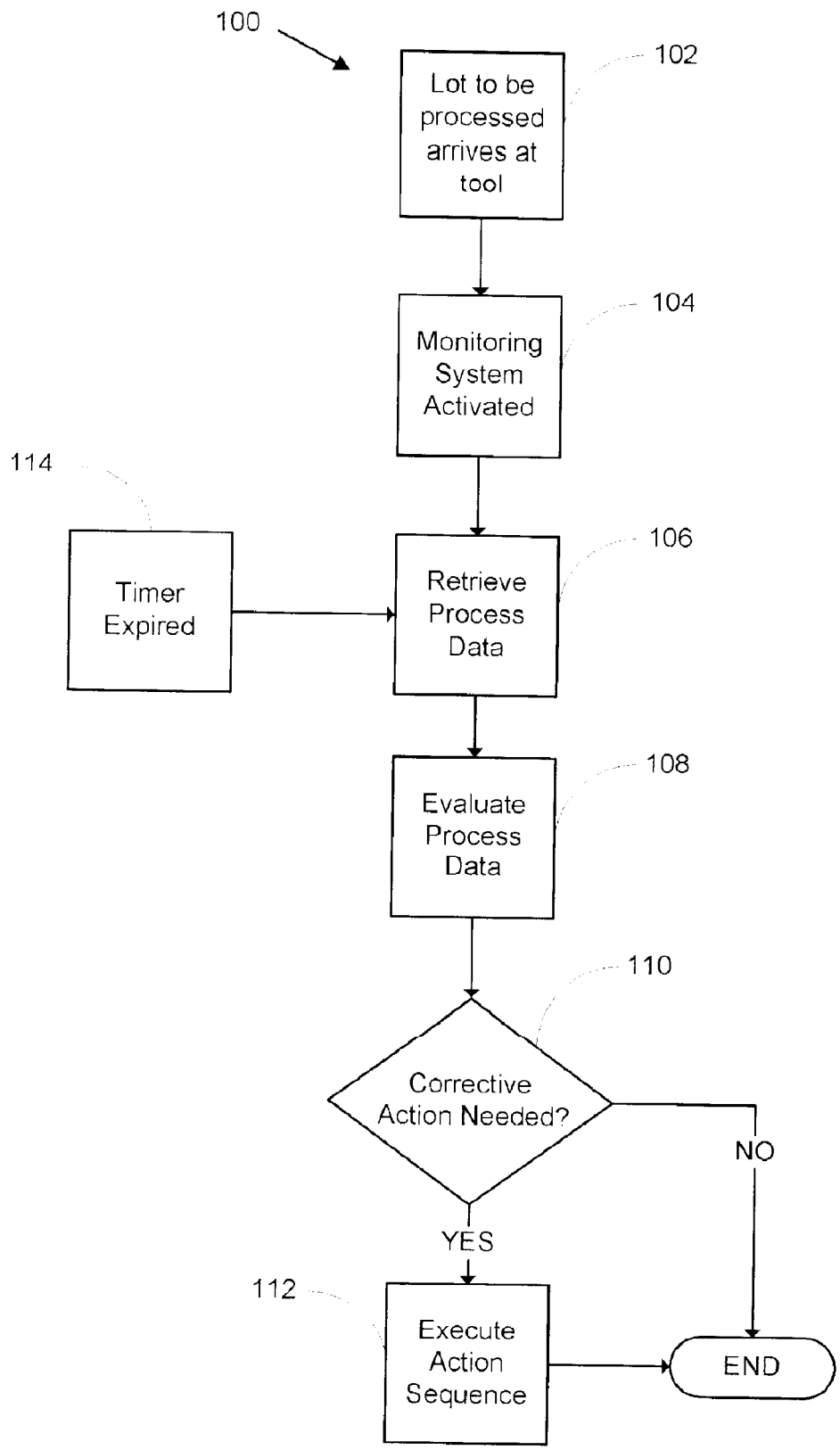
FIG. 1 is a flowchart indicating process steps for carrying out the method of the present invention.

FIG. 1 is a flowchart 100 indicating process steps for carrying out the method of the present invention. In step 102, the lot of wafers arrives at a process tool. The process tools monitored by the present invention may include, but are not limited to, the following process tool types:

Chemical Vapor Deposition Tool (CVD)
Physical Vapor Deposition Tool (PVD)
Stepper Tool
Sputter Tool
Spinner Tool
Tube Furnace
Reactive Ion Etch Tool (RIE)
Aligner
Ion Implantation System
Electrochemical Plating Tool (ECP)
Chemical Mechanical Polish Tool (CMP)

Typically the lot of wafers to be processed will arrive at a process tool via a wafer carrier. The wafer carrier is preferably handled by the AMHS to transport the lot to the various process tools needed to complete the manufacturing process. In process step 104, the monitoring system is activated for the process tool. This activation includes starting a timer which is specified by the user as an input parameter which is hereinafter referred to as the "process window time," or "PWT." In process step 106, process data is retrieved from the process tool. This process data may include, but is not limited to, current tool status, as well as a history of recent warnings or errors that occurred. The data is preferably retrieved via a data communications network as is known in the art. This may include a serial connection, an Ethernet, a wireless network, or other suitable communication means.

In process step 108, the process data is evaluated to determine if there are any actions to be taken. In process step 110, the severity of any warnings and errors reported by the process tool are compared to a user defined threshold to determine if any corrective actions are needed. The actions fall into two categories: Control Action Sequences (CAS), and Alerts. Examples of CASs include adjusting the parameters of a process tool, disabling a process tool, and rerouting wafer carriers to an alternate process tool. Alert examples include sending an e-mail message to a predetermined list of operators, sending an instant message to a predetermined list of operators, issuing text message alerts one or more mobile phones, issuing voice messages to one or more phones, and audible and visual alarm indications at the manufacturing facility. The action sequence is executed in process step 112 if necessary.

Examples of CASs that perform adjusting of parameters of a process tool include, but are not limited to, adjusting the temperature of a tube furnace, adjusting the rotational speed of a spinner, and adjusting the slurry flow rate of a chemical mechanical polish tool, just to name a few.

The text message alerts may be delivered by any suitable protocol, including the Short Message Service (SMS) which is well-known in the telecommunications industry. Similarly, the instant message alerts may be delivered by any suitable protocol, including, but not limited to, SIP (Session Initiation Protocol) and SIMPLE (SIP for Instant Messaging and Presence Leveraging Extensions). The SIP and SIMPLE specifications are issued by the Internet Engineering Task Force (IETF).

In process step 114, the timer that was previously started in process step 104 expires, indicating that the user specified process window time has elapsed. This event initiates a repeat of process steps 106-112. In this way, the status of a process tool is examined when the job starts, and at some predetermined later time, to monitor progress, and identify process problems as early as possible.

Figure 2:
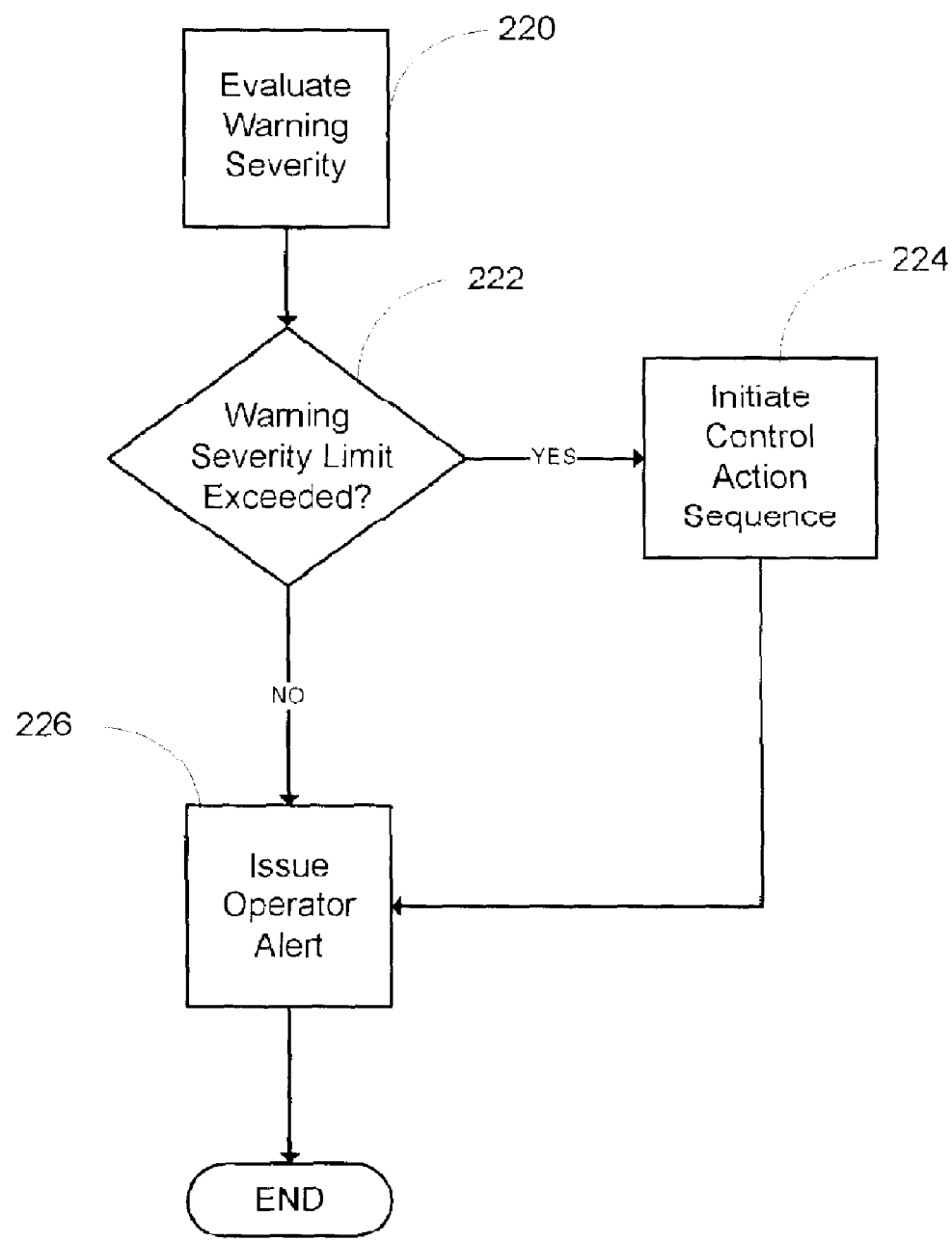
FIG. 2 is a flowchart indicating additional process steps for carrying out the method of the present invention.

FIG. 2 is a flowchart 200 indicating additional process steps for carrying out the method of the present invention. In particular, flowchart 200 shows additional detail occurring between process steps 108-112 of FIG. 1. In process step 220 the severity of any warnings or errors (for the purposes of this disclosure, both warnings and errors may be referred to collectively as "warnings") are reviewed. In one embodiment, each warning is evaluated and assigned a severity level. For example, each warning may be assigned a level from 1 to 5, with 5 being the most serious, and 1 being the least serious. The user establishes predetermined warning limits. These limits are compared against incoming warnings in process step 222. If the warnings exceed a particular threshold (e.g. a warning with a level of 4 or above), then a control action sequence is initiated in step 224. In another embodiment, the warnings retrieved from a process tool are compared against predetermined warning criteria. If the retrieved warning matches the predetermined warning criteria, a control action sequence is initiated. This control action sequence may include, but is not limited to, adjusting the parameters of a process tool, disabling a process tool, and rerouting wafer carriers to an alternate process tool.

Even if no control action sequence is necessary, it may still be desirable to notify operators of the warning conditions. An operator alert is then issued in process step 226. The operator alert may include one more notification means, such as sending an e-mail to a list of operators, sending an instant message to a list of operators, issuing text message alerts one or more mobile phones, issuing voice messages to one or more phones, and audible and visual alarm indications at the manufacturing facility. In another embodiment, the warning severity limit is also used as a criterion for issuing an operator alert. For example, in one embodiment, a user defined threshold warning level of 3 for operator alerts results in no operator alerts issued for warnings of levels 1 or 2, which are less serious in nature, and possibly informational, rather than indicative of a true error condition. In this way, operators are not "flooded" with an overload of data that is not critical for monitoring the semiconductor manufacturing process.

Figure 3:
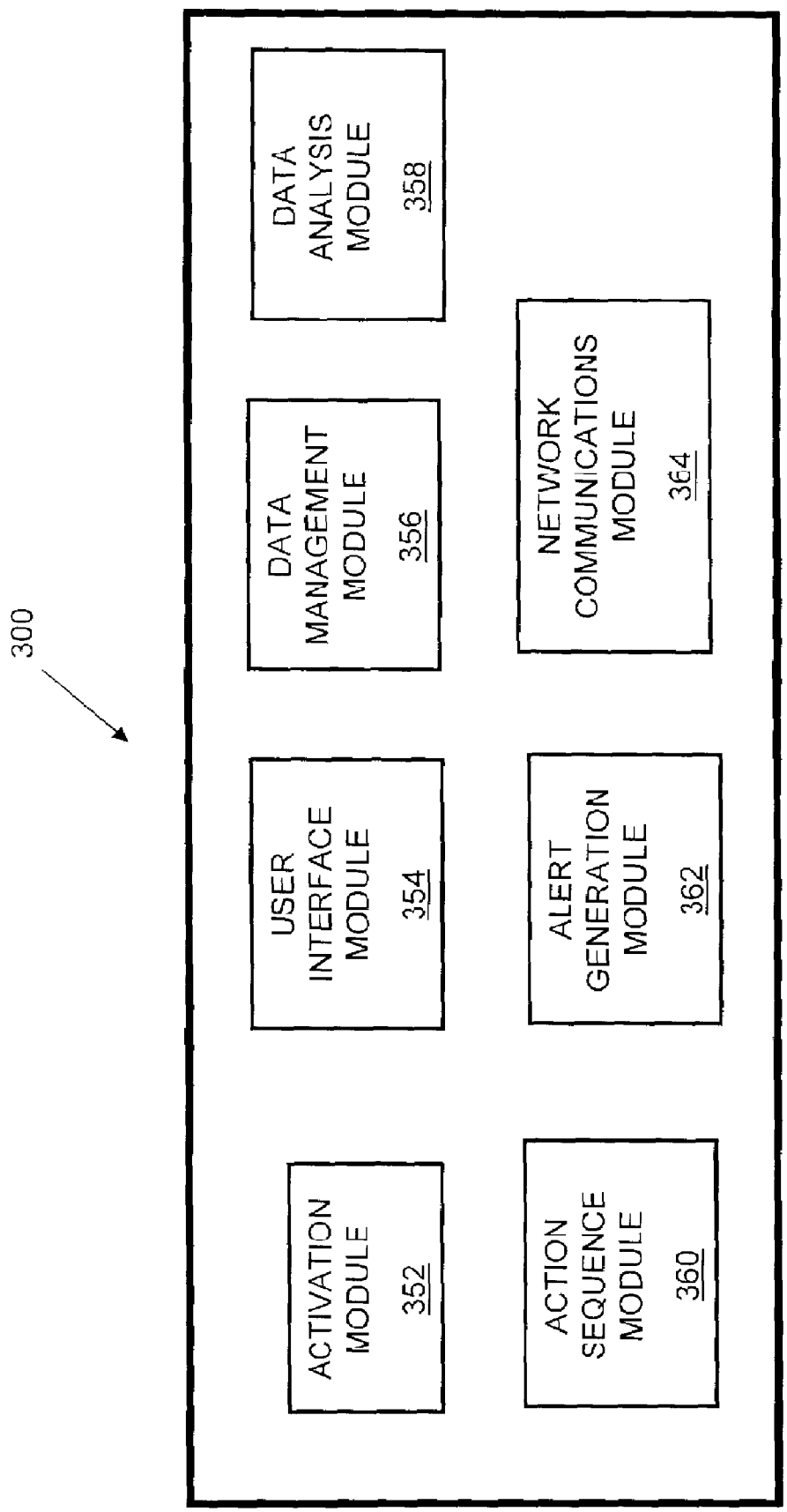
FIG. 3 is a block diagram of a system of the present invention.

FIG. 3 is a block diagram of a semiconductor process monitoring system 300 of the present invention. Activation module 352 is configured to initiate a monitoring sequence upon detecting an initiation event. The initiation event starts a monitoring process cycle. More than one type of initiation event is contemplated. Initiation events include, but are not limited to, arrival of a lot of wafers at a process tool, expiry of a process window timer, and manual initiation by an operator, such as an explicit request to assess the status of one or more process tools. The activation module 352 is preferably implemented via a computer having a microprocessor, RAM, non-volatile memory, and I/O interfaces, as is known in the art.

The user interface module 354 allows the user to establish operating parameters for the semiconductor process monitoring system 300. These parameters include, but are not limited to, a global PWT, a per process tool default PWT, a job based global PWT, and a job based process tool PWT. The job based parameters allow for tailoring the monitoring system 300 for a specific device to be manufactured. For example, in the case of a die requiring the use of a single reticle, the PWT of a stepper tool may be set to 45 minutes. In the case of a die requiring the use of multiple reticles, the PWT may be set to 90 minutes to accommodate the increased required processing time. The present invention allows the PWT for each tool to be set for a specific job, or to use a default time when no job-based PWT time is specified.

The data management module 356 preferably comprises a database residing on a non-volatile data storage medium such as a hard disk (not shown). The process data retrieved from the process tool (see process step 106 of FIG. 1) is stored in the database. This data is then analyzed by the data analysis module 358. The data analysis module 358 performs process steps 108 and 110 by examining the data stored by the data management module 356, and comparing it with parameters entered via user interface module 354. For example, the warnings reported by the process tool are compared with a predetermined list of warnings established by the user. If the data analysis module 358 determines that action is necessary, an action sequence indication is generated, and sent to the action sequence module 360, and/or the alert generation module 362, depending on the severity of the warnings contained in the process data that was retrieved and stored by the data management module 356. The action sequence indication may be in the form of a message sent by the data analysis module, or asserting an output signal to a state representative of an action sequence indication.

The action sequence module generates a CAS (Control Action Sequence) which may include:

Disabling a process (all process tools of a particular process);

Disabling a single process tool (allowing other process tools of that process to continue);

Disabling the entire manufacturing operation (for an error deemed extremely serious); and Adjusting a process tool (e.g., sending new recipe parameters to a process tool).

The monitoring system communicates with the process tools via network communications module 364.

The alert generation module issues alerts to the operator via one or more mechanisms that may include:

Issuing an e-mail message to one or more operators;
Issuing an instant message to one or more operators;
Issuing a text message to one or more operators;
Issuing a voice message to one or more operators;
Sounding an audible alarm at the manufacturing facility; and
Generating a visual indication (such as a flashing light) at the manufacturing facility.

The monitoring system dispatches the alerts via network communications module 364.

It will be understood by one of ordinary skill in this art that the monitoring system 300 may be implemented on a single computer system. Alternatively, one or more modules can be executed on distributed computers that communicate with each other via a data communications network.

It will be understood that the present invention may have various other embodiments. Furthermore, while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed. Thus, the scope of the invention should be determined by the appended claims and their legal equivalents, rather than solely by the examples given.

What is claimed is:

1. A method for monitoring a semiconductor manufacturing process, comprising the steps of:
    defining at least one process window time (PWT);
    retrieving process data from a process tool;
    storing said process data;
    analyzing said process data;
    generating an action sequence indication based on the outcome of the analyzing step;
    accepting at least one process window time from a user;
    detecting an initiation event;
    initiating a monitoring sequence;
    executing an action sequence;
    issuing at least one operator alert,
    establishing a process window time for a particular process tool;
    associating the process window time with a particular job; and
    wherein the step of detecting an initiation event comprises the step of detecting the expiry of the process window time.

2. The method of claim 1, wherein the step of detecting an initiation event comprises the step of detecting the arrival of a lot of wafers at the process tool.

3. The method of claim 1, wherein the step of detecting an initiation event comprises the step of detecting a manual initiation from an operator.

4. The method of claim 1, wherein the step of executing an action sequence is selected from the steps of disabling a process, disabling a process tool, and adjusting a process tool.

5. The method of claim 1, wherein the step of issuing at least one operator alert further comprises the step selected from the group of sending an e-mail to a predetermined list of recipients, sending a text message to a predetermined list of recipients, and sending an instant message to a predetermined list of recipients.

6. The method of claim 1, wherein the step of analyzing said process data comprises comparing at least one warning retrieved from a process tool to predetermined warning criteria, and issuing a control action sequence if the retrieved warning matches the predetermined warning criteria.

7. The method of claim 1, wherein the step of adjusting a process tool is selected from the group comprising adjusting the temperature of a tube furnace, and adjusting the slurry flow rate of a chemical mechanical polish tool.

8. The method of claim 1, further comprising:
activating a monitoring system monitoring the semiconductor manufacturing process by starting a timer.

9. The method of claim 8, further comprising:
indicating that the user-specified process window has elapsed when the timer expires.

10. The method of claim 1, further comprising:
examining a status of the process tool when a job starts, and at some predetermined later time, to monitor progress, and identify process problems as early as possible.

11. The method of claim 1, further comprising:
establishing operating parameters for a monitoring system monitoring the semiconductor manufacturing process, wherein said operating parameters are selected from the group consisting of a global PWT, a per process tool default PWT, a job based global PWT, and a job based process tool PWT.

12. The method of claim 1, further comprising:
assigning a seventy level to warnings;
establishing predetermined warning limits;
comparing incoming warnings against the predetermined warning limits;
if the incoming warnings exceed a first threshold, initiating a control action sequence comprising a step selected from the group consisting of adjusting the parameters of the process tool, disabling the process tool, and rerouting wafer carriers to an alternate process tool.

13. The method of claim 12, further comprising:
if the incoming warnings do not exceed the first threshold, and exceed a second threshold lower than the first threshold, notifying the user;
if the incoming warnings do not exceed the first threshold, and exceed a second threshold lower than the first threshold, not notifying the user.

* * * * *